United States Patent [19]
Williams et al.

[11] Patent Number: 5,629,851
[45] Date of Patent: May 13, 1997

[54] CRUISE CONTROL SYSTEMS FOR MOTOR VEHICLES

[76] Inventors: Malcolm Williams, 16 Ashlawn Crescent, Solihull, West Midlands; Nigel J. Clarke, 57 Cherry Tree Lane, Halesowen, West Midlands B63 1DU, both of United Kingdom

[21] Appl. No.: 438,095

[22] Filed: May 8, 1995

Related U.S. Application Data

[63] Continuation of Ser. No. 162,499, Dec. 3, 1993.

[30] Foreign Application Priority Data

Dec. 24, 1992 [GB] United Kingdom ............... 9226930

[51] Int. Cl.⁶ .......................... G01S 13/93; B60K 31/00
[52] U.S. Cl. .................. 364/426.044; 364/461; 340/903; 367/99
[58] Field of Search .................. 364/426.04, 426.01, 364/460, 461; 340/901, 903, 904, 906; 342/70, 71, 96; 367/89, 99, 118

[56] References Cited

U.S. PATENT DOCUMENTS

| | | | |
|---|---|---|---|
| 4,158,841 | 6/1979 | Wüchner et al. | 342/71 |
| 4,681,431 | 7/1987 | Sims et al. | 356/3.09 |
| 4,703,429 | 10/1987 | Sakata | 364/426.04 |
| 4,757,450 | 7/1988 | Etoh | 364/426.04 |
| 5,249,157 | 9/1993 | Taylor | 340/903 |

*Primary Examiner*—Kevin J. Teska
*Assistant Examiner*—Tan Nguyen
*Attorney, Agent, or Firm*—Davis and Bujold

[57] ABSTRACT

A cruise control system for a motor vehicle includes a forward looking distance sensor adapted to sense vehicles moving in the same path as the equipped vehicle or in paths adjacent to the equipped vehicle, the system tracking vehicles in front of or in paths adjacent to the equipped vehicle and controlling braking or acceleration of the equipped vehicle in response to vehicles travelling in front of or on converging paths with the equipped vehicle, in order to maintain a safe distance between the equipped vehicle and vehicles in or entering its path.

15 Claims, 2 Drawing Sheets

CRUISE CONTROL SYSTEMS FOR MOTOR VEHICLES

This is a continuation of copending application Ser. No. 08/162,499 filed on Dec. 3, 1993.

BACKGROUND TO THE INVENTION

The present invention relates to cruise control systems for motor vehicles.

Cruise control systems currently fitted on motor vehicles, once engaged by the driver, would maintain the vehicle at a constant speed without the driver having to take action. Such systems operate conventionally through the vehicle throttle only.

Cruise control systems of this type are beneficial on open roads with low traffic flows. However, on more congested roads where the equipped vehicle may catch up with slow moving vehicles or passing vehicles may pull in front of the equipped vehicle at an unsafe distance, the driver must frequently disengage the cruise control system, so that he may adjust the speed of the equipped vehicle to maintain a safe distance from the vehicles in front.

It has been proposed to fit a forward looking distance sensor at the front of the equipped vehicle, so that by using brake and throttle interaction, the cruise control system may be used to maintain a safe distance from a target vehicle in front of the equipped vehicle. Such systems should be capable of maintaining a safe distance between vehicles and even if the target vehicle brakes moderately, it should be possible to maintain a safe distance without excessive braking of the equipped vehicle. If the system assesses that a braking effort in excess of for example 0.3 g is required, the system will alert the driver and it will be up to the driver to apply a greater braking effort if he considers it necessary. This will happen if a vehicle pulls in front of the equipped vehicle, thus taking the place of the target vehicle but at a much closer distance. In such circumstances, it will appear to the cruise control system that the target vehicle has slowed to such an extent that emergency braking is required. However, it is probable in such circumstances, that the vehicle pulling in is travelling faster than or at equal speed to the equipped vehicle and that a safe driving distance can be achieved with only moderate deceleration.

SUMMARY OF THE INVENTION

According to one aspect of the present invention a cruise control system for a motor vehicle comprises: a forward looking distance sensor means, the distance sensor means being capable of sensing vehicles moving in the same path as the equipped vehicle and also in paths adjacent to the path of the equipped vehicle; means to process signals from the sensor means to provide information of the range, relative velocity and direction of movement of vehicles travelling in front of or in paths adjacent to the equipped vehicle; and means to control braking and acceleration of the equipped vehicle in response to vehicles travelling in front of or on converging paths with the equipped vehicle, in order to maintain a safe distance between the equipped vehicle and vehicles in or entering its path.

By monitoring the range, relative velocity and direction of movement of vehicles in adjacent paths as well as in front of the equipped vehicle, the interception of the path of the equipped vehicle by vehicles on either side may be predicted and in normal circumstances appropriate adjustments made without resorting to emergency braking. In exceptional circumstances the system may be capable of initiating an emergency braking operation.

In addition to forward looking distance sensor means, the equipped vehicle will be equipped with a sensor to monitor its own speed relative to the road, so that the appropriate safe distance may be calculated. In addition, sensors may be provided to; monitor condition of the road surface so that the probable braking performance of the vehicle can be assessed; monitor the steering angle of the equipped vehicle so that its intended path can be taken into account; and monitoring the equipped vehicle's longitudinal and lateral acceleration so that cornering can be taken into account.

Radar means is particularly suitable for use as a distance sensor means. However, other means, for example laser, infra-red sensors or telemetric means may be used, provided that such means are capable of operating appropriately under all weather conditions. The sensor will preferably have a field of view of the order of 15° or greater. The pattern covered by the sensor means may however be tailored having, for example, longer range for small angles, eg up to 9°, and shorter range on either side of 9°.

The sensor may comprise a single sensor which is scanned mechanically from side to side, or an array of sensors which are scanned electronically.

Control of the throttle or brakes of the equipped vehicle may be through suitable servo means or through the engine and brake management control systems.

BRIEF DESCRIPTION OF THE DRAWINGS

An embodiment of the invention is now described, by way of example only, with reference to the accompanying drawings, in which.

DESCRIPTION OF A PREFERRED EMBODIMENT

Figure 1:
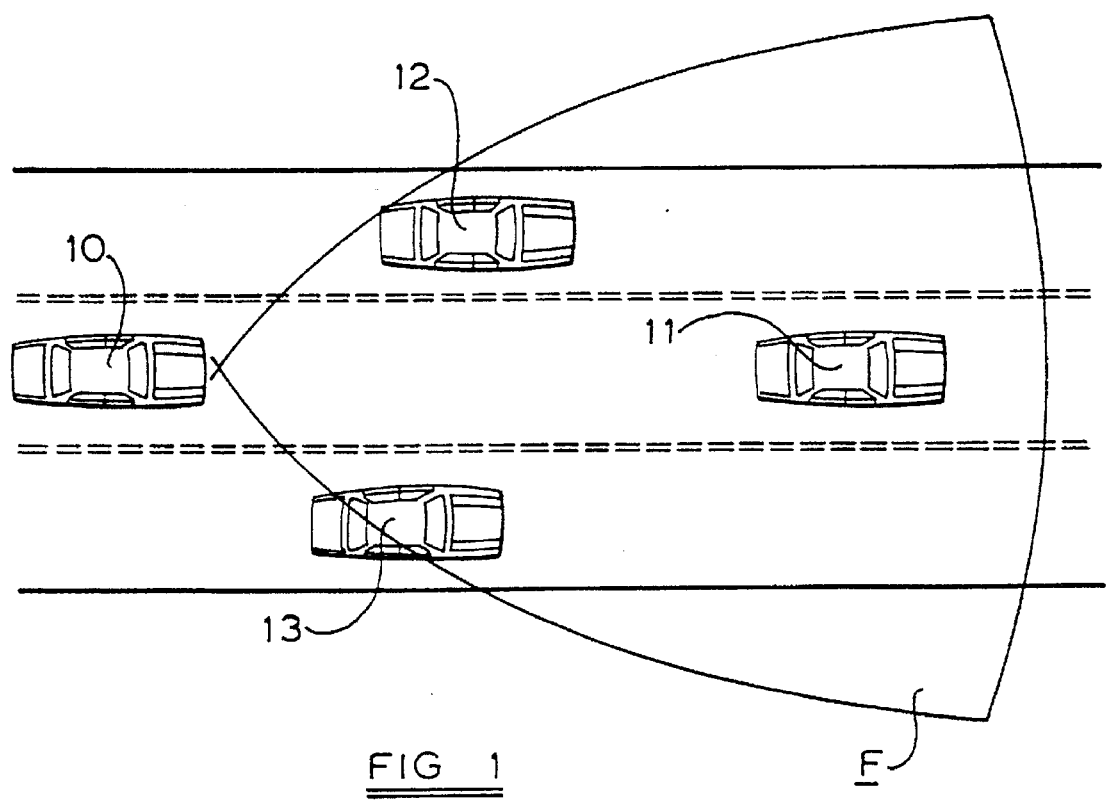
FIG. 1 is a diagramatic plan view of vehicles travelling along a three lane highway.
Figure 2:
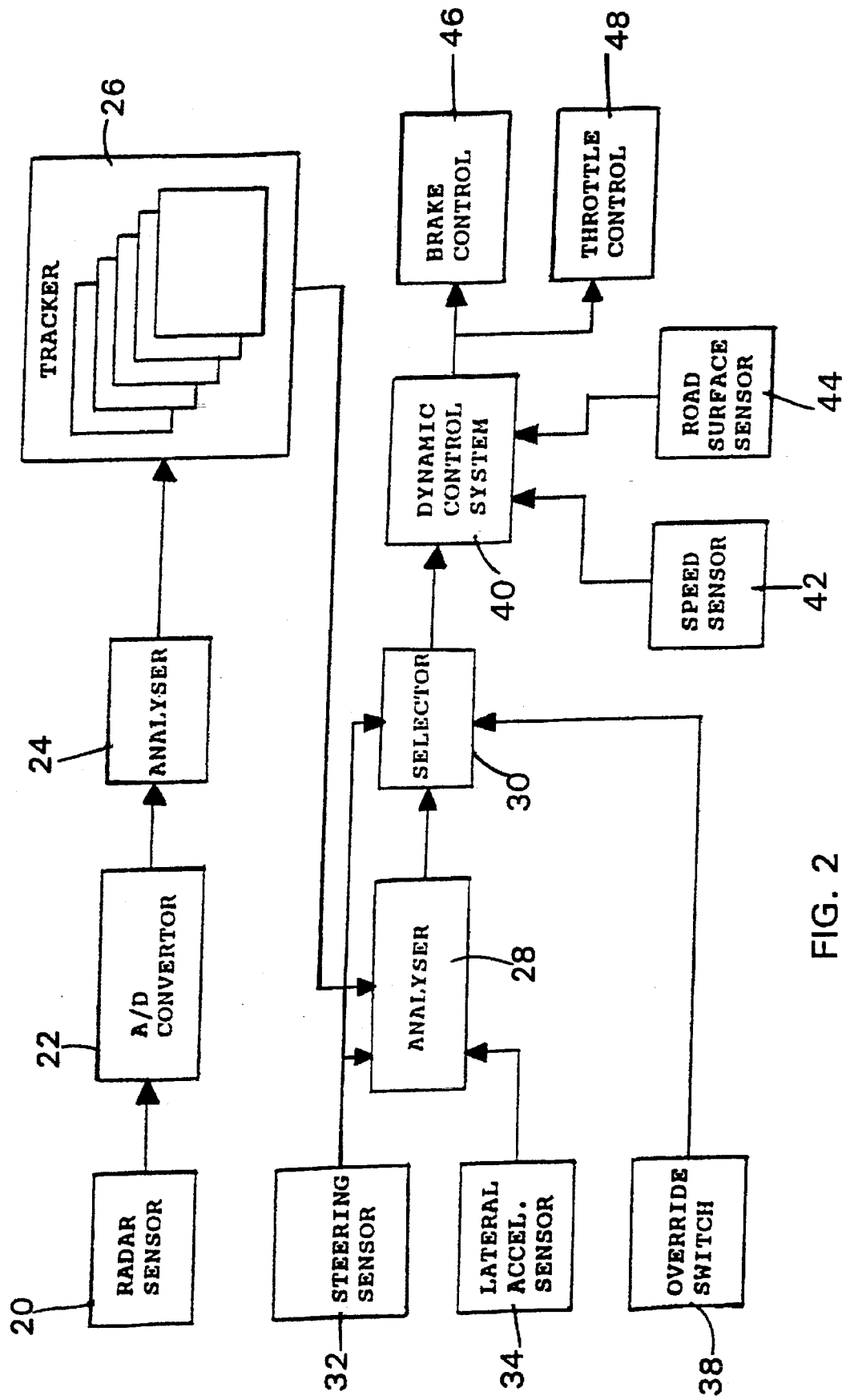
FIG. 2 is a block diagram of a cruise control system in accordance with the present invention.

As illustrated in FIGS. 1 and 2, a vehicle 10 is equipped with a cruise control system having radar sensing means 20 having a field of view F which will cover a vehicle 11 travelling in front of the equipped vehicle 10 in the same lane and also vehicles 12 and 13 travelling in front of the equipped vehicle 10 in lanes on either side of the equipped vehicle 10.

The radar sensing means 20 comprises a series of radar sensors directed at different angles to cover the field of view F. The radar sensors are scanned electronically to give signals corresponding to the range and bearing of each vehicle 11, 12, 13 in the field of view F.

The sensing means 20 is connected to an analogued to digital converter 22 by means of which the signals from the sensing means 20 are digitised. The signals are then passed to analyser means 24 which will analyse successvie signals from each object detected by the sensing means 20 and select possible targets, that is vehicles 11, 12, 13 travelling in the same direction as the equipped vehicle 10 in the same or adjacent paths. The analyser means 24 will disregard, for example, signals from vehicles travelling in the opposite direction or stationary objects.

Tracker means 26 then monitors the signals relating to the possible targets selected by analyser means 24 and from successive signals relating to the range and bearing of each possible target, calculate its position, velocity and direction of movement relative to the equipped vehicle 10.

The information on each of the possible targets is then passed to an analyser and selection means 28,30 which assesses each possible target and selects the most appropriate target. This will normally be the closest target which is directly in the path of the equipped vehicle 10, that is vehicle 11. However, if the tracker means 26 indicates that a possible target vehicle 12 or 13 in an adjacent path is about to come into the path of the equipped vehicle 10, then the system may switch to this alternative target.

The analyser means 28 also has an input from a sensor 32 measuring the angle of steering of the equipped vehicle 10. By this means, the intended path of the equipped vehicle 10 may be taken into account in assessing the most appropriate target. A further input from sensor 34 measures the longitudinal and lateral acceleration of the equipped vehicle 10 and will also permit cornering, when the forward looking sensor will not be centered along the path of the equipped vehicle 10, to be taken into account in assessing the most appropriate target.

Means 38 may also be provided by which the driver may override the selected target and give him the option of selecting an alternative target. This may be required, if the driver intends to change lane and wishes to ignore the vehicle directly in front or a vehicle approaching from the other side.

The analyser and selection means 28, 30 passes on information relating to the selected target to a vehicle dynamic control system 40. Inputs from sensors 42 and 44 provide information as to the speed of the equipped vehicle 10 and the condition of the road surface, so that the control system 40 may determine the amount of deceleration or acceleration required to maintain a safe distance with the target. The control system 40 will then produce signals to operate a brake control 46 and/or throttle control 48 appropriately to accelerate or decelerate the equipped vehicle 10, as required. Means may also be provided to enable the driver to set a maximum speed.

If, while the cruise control system is in control of the equipped vehicle 10, the target vehicle disappears, then if the equipped vehicle 10 is travelling in a straight path, the equipped vehicle 10 may be accelerated until it reaches the maximum speed at which the cruise control system has been set, or another appropriate target comes into range. If, however, the equipped vehicle is cornering, so that loss of contact with the target vehicle may be due to the curvature of the road, the equipped vehicle 10 will maintain its speed corresponding to the last known relative position of the target vehicle, until contact with the target vehicle is re-established or the equipped vehicle 10 reverts to a straight path.

We claim:

1. A cruise control system for a motor vehicle comprising:
    a) a forward looking distance sensor means, the distance sensor means being arranged to sense vehicles moving in the same path as the equipped vehicle and also in paths adjacent to the path of the equipped vehicle;
    b) means to process signals from the sensor means to provide information of range, relative speed and direction of movement of vehicles traveling substantially in the same direction as and in front of the equipped vehicle, in the same path and in paths adjacent to the equipped vehicle;
    c) means for processing the successive range, relative speed and directional information of vehicles traveling substantially in the same direction as and in front of the equipped vehicle, in the same path as and in paths adjacent to the equipped vehicle, to track said vehicles;
    d) means to initially select said tracked vehicle that is closest to and in the same path as the equipped vehicle as a preferred target, while said means for processing continues to track all said tracked vehicles;
    e) means for identifying said tracked vehicle in an adjacent path that is converging with the path of the equipped vehicle;
    f) means for determining, according to the successive range, relative speed and directional information of the preferred target and the converging vehicle, whether the converging vehicle is the most appropriate target, and if the converging vehicle is the most appropriate target, switching to the converging vehicle as the preferred target; and
    g) means to control speed of the equipped vehicle in response to the preferred target, in order to maintain a safe distance between the equipped vehicle and preferred target.

2. A cruise control system according to claim 1 further comprises means to (i) accelerate speed of the equipped vehicle to a preset maximum cruising speed when the preferred target disappears and the equipped vehicle is travelling in a straight path, and (ii) maintain the equipped vehicle's current speed when the preferred target disappears and the quipped vehicle is travelling around a curve, until one of the preferred target reappears and the quipped vehicle is travelling in a straight path.

3. A cruise control system according to claim 1, wherein the forward looking sensor means has a field of view on the order of 15 degrees.

4. A cruise control system according to claim 1 in which the speed of the equipped vehicle is controlled by means of the braking system of said vehicle.

5. A cruise control system according to claim 1 in which the speed of the equipped vehicle is controlled by a combination of the throttle and the braking systems of said vehicle.

6. A cruise control system according to a claim 1 in which the forward looking sensor means is a radar sensor.

7. A cruise control system according to claim 1 in which the forward looking sensor means comprises a single sensor which is scanned mechanically, horizontally from one side of a longitudinal axis of the vehicle to the other to cover a required field of view.

8. A cruise control system according to claim 1 in which the forward looking sensor means comprises an array of sensors angled with respect to one another to cover a required field of view, and the sensors are scanned electronically.

9. A cruise control system according to claim 1 further including;
    a) means for monitoring successive signals from each object detected by the sensor means and from said signals selecting the possible targets corresponding to objects moving in the same direction as the equipped vehicle in the path of the equipped vehicle and in paths adjacent to the equipped vehicle; and
    b) means for tracking each possible target and for selecting a most appropriate target and means for controlling the speed of the vehicle in response to a relative position and speed of the most appropriate target relative to the equipped vehicle.

10. A cruise control system according to claim 1 in which the speed of the vehicle is controlled by means of the throttle system of the vehicle.

11. A cruise control system according to claim 1 in which servo means are provided to control the throttle system of the vehicle.

12. A cruise control system according to claim 1 in which means is provided to monitor the speed of the equipped vehicle relative to the road.

13. A cruise control system according to claim 1 in which sensors are provided to measure a condition of the road surface.

14. A cruise control system according to claim 1 in which sensors are provided to measure the steering angle of the equipped vehicle and the longitudinal and lateral acceleration of the equipped vehicle.

15. A cruise control system according to claim 1 in which means is provided to permit the driver to override the selected target.

\* \* \* \* \*